(12) United States Patent
Holmes et al.

(10) Patent No.: US 6,343,621 B1
(45) Date of Patent: Feb. 5, 2002

(54) VARIABLE FORCE SOLENOID CONTROL VALVE

(75) Inventors: Garrett Robert Holmes, Ortonville; Howard William Saxon, Clinton Township, both of MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/607,811

(22) Filed: Jun. 30, 2000

(51) Int. Cl.[7] ............................................. F15B 13/043
(52) U.S. Cl. ............................ 137/625.61; 137/625.64; 251/129.14
(58) Field of Search ....................... 137/625.61, 625.64; 251/129.14

(56) References Cited

U.S. PATENT DOCUMENTS

| | | | | |
|---|---|---|---|---|
| 4,966,195 A | * | 10/1990 | McCabe | 137/625.61 |
| 6,029,703 A | * | 2/2000 | Erickson et al. | 137/625.61 |

* cited by examiner

Primary Examiner—Gerald A. Michalsky
(74) Attorney, Agent, or Firm—Artz & Artz P.C.; Greg Dziegielewski

(57) ABSTRACT

A solenoid control valve (10) that includes an electromagnetic coil (30) positioned within a housing (16) and a spool valve (72) positioned within a central bore (70) of a valve body (20). An armature (40), including a pin element (44) and a check ball (45), is axially positioned within the coil (30) and an armature spring (52) biases the check ball (45) against an opening in the central bore (70) when the coil (30) is not energized. The spool valve (72) includes an internal chamber and a pair of sealing lands (98,100) that selectively seal a supply port (92) and a control port (94) within the valve body (20). A pole piece (26), including an annular flux shunt portion (62), is threadably engaged with the housing (16) to control a working air gap (60) between the pole piece (26) and the armature (40). The flux shunt portion (62) more radially directs the electromagnetic field lines to weaken the magnetic force as the armature (40) moves closer to the pole piece (26). A flux tube (64) is positioned within the housing (16).

19 Claims, 2 Drawing Sheets

VARIABLE FORCE SOLENOID CONTROL VALVE

TECHNICAL FIELD

The present invention relates generally to a fluid control valve and, more particularly, to a variable force solenoid control valve with reduced size and with reduced mechanical and magnetic hysteresis.

BACKGROUND ART

Solenoids are well known in a variety of industries and are utilized for a variety of applications. On such industry that utilizes solenoids, is the automotive industry. One of the many applications within the automotive industry where solenoids are utilized is in automatic transmission systems. Often vehicles utilize an automatic transmission controller that uses solenoids to control the pressure of the transmission fluid. The control of transmission fluid pressure can be used to engage and disengage the transmission clutch in response to an electrical input signal supplied to the solenoid, or the control of transmission fluid pressure can be used to simply maintain transmission line pressure.

One particular type of solenoid is commonly referred to as a variable force solenoid control valve. Typically, variable force solenoid control valves are provided with fluid control components consisting of a spool valve having a stem and two radially extending lobes or lands. The spool valve is movably confined within a valve body to create flow restrictions for pressure regulation. Fluid passages are provided in the valve body which communicate with the various surfaces of the spool valve. Commonly, fluid at inlet pressure is delivered to a flow restriction provided between the two spool valve lands. The flow restriction enables the fluid pressure to be reduced to a desired outlet control pressure.

Although the variable force solenoid control valves known in the prior art have generally been successful in meeting the demands of the industry, these control valves can be further improved upon. Improvements in the areas of cost, size, reduction of hysterisis, sensitivity, and calibration are still possible and highly desirable. Even recent developments in solenoid design, such as the use of a flux shunt, leave significant room for improvement. The ever present need for reductions of cost and weight combined with the need for increased efficiency, are often driving factors in the automotive industry (as well as elsewhere).

It would therefore be highly desirable to have a variable force solenoid control valve that made further progress towards reductions in cost, weight and hysteresis and additionally made improvements to control sensitivity and calibration.

SUMMARY OF THE INVENTION

It is therefore an object of the present invention to provide a variable force solenoid control valve that provides reductions in cost, weight, and hysteresis. It is a further object of the present invention to provide a variable force solenoid control valve that provides improvements to control sensitivity and calibration.

In accordance with the objects of the present invention, a variable force solenoid control valve is disclosed that includes an electromagnetic coil positioned within a housing and a spool valve positioned within a central bore of a valve body. An armature is axially positioned within the coil, and includes a pin element and a check ball. An armature spring biases the armature, and thereby the check ball, against an opening in the central bore when the coil is not energized. An upper pin bearing and a lower pin bearing limit the armature to coaxial movement within the housing. The spool valve includes an internal chamber and a pair of sealing lands that selectively seal a supply port and a control port within the valve body. A pole piece, including an annular flux shunt portion, is threadably engaged with the housing to control a working air gap between the pole piece and the armature. The flux shut portion more radially directs the electromagnetic field lines to weaken the magnetic force as the armature moves closer to the pole piece. A flux tube is positioned within the housing.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

The following discussion of the preferred embodiments directed to a variable force solenoid control valve is merely exemplary in nature and is in no way intended to limit the invention or its applications or uses.

Figure 1:
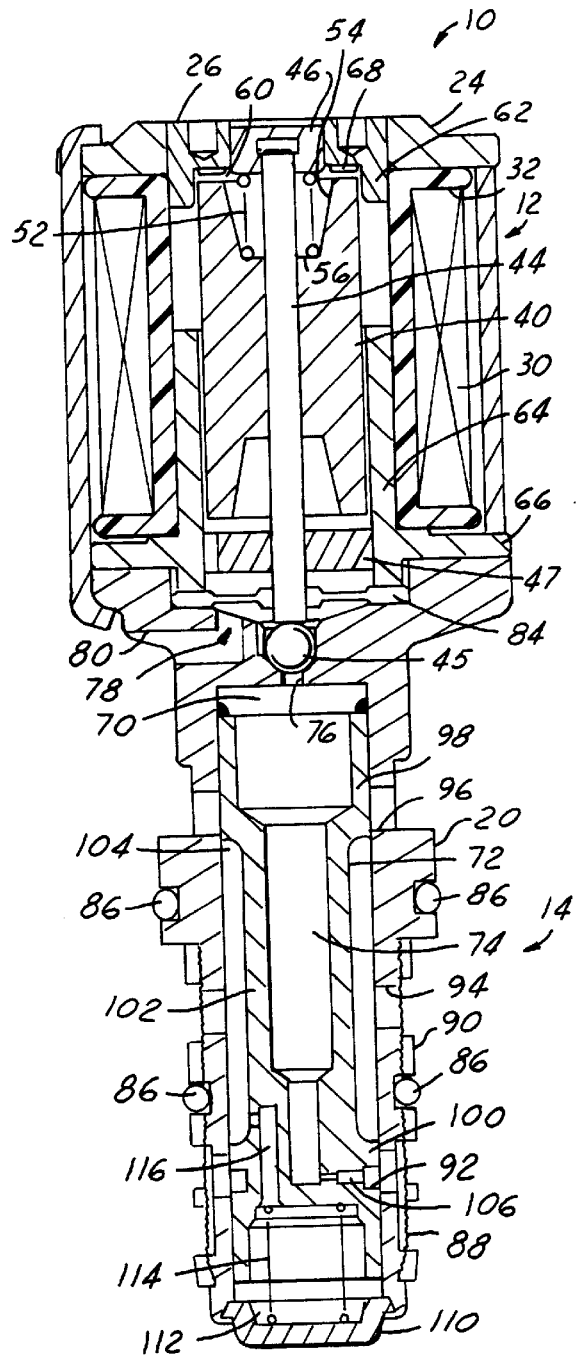
FIG. 1 is a cross-sectional view of an embodiment of a variable force solenoid control valve in accordance with the present invention.
Figure 3:
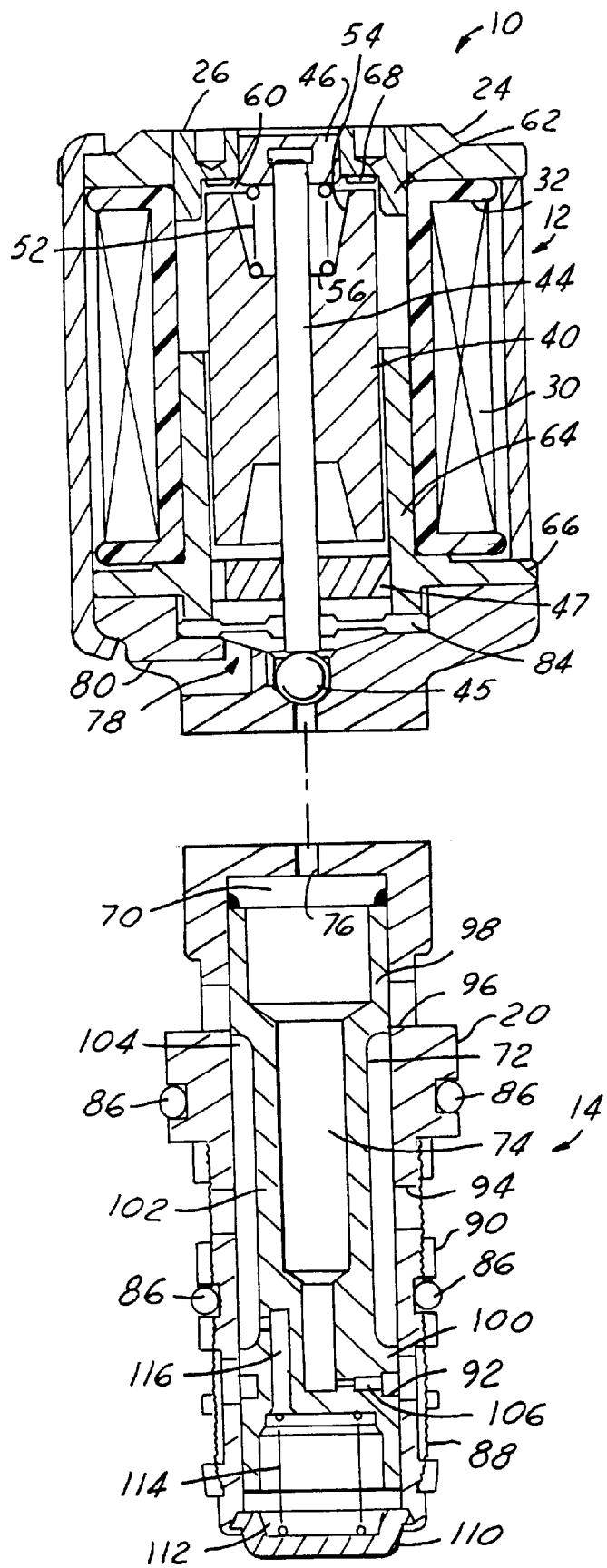
FIG. 3 is a cross-sectional view of an alternate embodiment of a variable force solenoid control valve in accordance with the present invention, the variable force solenoid control valve illustrated with the valve body assembly remotely situated from the housing.

Referring now to FIG. 1, which is a cross-sectional view of a variable force solenoid control valve 10, according to an embodiment of the present invention. In one embodiment, the solenoid control valve 10 is a fluid control valve employed as a regulator for the engagement and disengagement of the transmission gearing in an automatic transmission (not shown) of a vehicle. In another embodiment, the solenoid control valve is simply used to maintain line pressure within the transmission lines. The use of a variable force control valve as a pressure regulator in an automatic transmission is known in the art. As will be appreciated by those skilled in the art, the control valve 10 of the invention is not limited for use in an automatic transmission of a vehicle, but has a much broader use in any control device that may use a solenoid valve of the type described herein.

The control valve 10 is separated into a magnetic portion 12 and a hydraulic portion 14. The magnetic portion 12 includes a solenoid case 16 that encloses the magnetic components of the valve 10. The solenoid case 16 is attached to a valve body 20 in the hydraulic portion 14 by crimping a the solenoid case 16 around a portion of the valve body 20. Although the solenoid case 16 has been described as attaching the magnetic portion 12 to the hydraulic portion 14, it should be understood that a variety of attachment methods are contemplated. Furthermore, it is contemplated that the hydraulic portion 14 may in fact be remotely situated from the magnetic portion 12 as long as a pathway for fluid communication between the hydraulic portion 14 and the magnetic portion 12 is provided. A flux washer 24 supports a magnetic pole piece 26 mounted to the solenoid case 16, as shown. In one embodiment, the pole piece 26 is threadably engaged to the flux washer 24 to be adjustably positionable within the solenoid case 16 for reasons that will become apparent from the discussion below. Of course, the pole piece 26 can be mounted to the solenoid case 16 by any suitable technique.

The magnetic portion 12 further includes a coil 30 wound on a non-magnetic bobbin 32 and coaxially positioned within the solenoid case 16 as shown. A cylindrical shaped armature 40 is coaxially positioned at the center of the solenoid case 16. In one embodiment, the armature 40 is made of a magnetic powdered metal to receive the magnetic flux lines created by the coil 30 when it is energized. However, as will be appreciated by those skilled in the art, the armature 40 can be made of any suitable magnetic material. The armature 40 includes an pin element 44 with a check ball 45 at its lower end. An upper pin bearing 46 and a lower pin bearing 47 position the armature 40 and limit the motion of the armature 40 to primarily co-axial movements. An armature spring 52 is positioned within a bore 54 extending through the top end of the armature 40. One end of the spring 52 rests against a bottom wall 56 of the bore 54, and an opposite end of the spring 52 is mounted on the upper pin bearing 46. The armature spring 52 applies a bias against the armature 40 towards the hydraulic portion 14.

A working air gap 60 is defined between a bottom surface of the pole piece 26 and the top end of the armature 40. The pole piece 26 includes an annular flux shunt portion 62 that extends down from the outer perimeter of a bottom surface of the pole piece 26. The pole piece 26 and the flux shunt portion 62 are a single piece of metal. A washer 68 is positioned with the air gap 60 to further control the air gap spacing. A cylindrical flux tube 64 is positioned between the armature 40 and the coil 30. The flux tube 64 includes an annular flange 66 that is mounted between the solenoid case 16 and the valve body 20. In one embodiment, the flux tube 64 is also made of a magnetic steel, and is formed by a deep drawn process to reduce costs.

When the coil 30 is energized, the magnetic flux lines generated by the coil 30 enter the solenoid case 16 and travel into the pole piece 26. The magnetic flux lines then travel across the gap 60 and enter the armature 40. Some of the magnetic flux lines enter the armature 40 through the flux shunt portion 62. The magnetic flux lines travel down the armature 40 and cross directly into the flux tube 64. The use of an upper pin bearing 46 and a lower pin bearing 47 in combination with the pin element 44 allows the armature 40 to travel in close proximity to the flux return tube 64 without the need for a non-magnetic bearing element positioned between the flux tube 64 and the armature 40 as can be required in prior designs. This setup allows further reduction in magnetic hysteresis and allows a reduction in the size of the solenoid 10. The magnetic flux lines travel through the flux tube 64 to return to the solenoid case 16 to complete the magnetic path. The magnetic flux lines across the gap 60 cause the armature 40 to be attracted to the pole piece 26, thus causing the armature 40 to move upwards towards the pole piece 26 against the bias of the spring 52.

When the coil 30 is energized, the armature 40 is attracted to the pole piece 26 against the bias of the spring 52 such that the air gap 60 narrows and the flux shunt portion 62 encloses a top portion of the armature 40. As the armature 40 moves towards the pole piece 26, the magnetic flux lines become more radially oriented relative to the armature 40 because of the flux shunt portion 62. This linearizes the magnetic force gain and slows the armature 40. In other words, the flux shunt portion 62 directs some of the flux transfer across the air gap 60 to a more radial direction which becomes more radial as the armature 40 moves upward. This change in flux transfer direction weakens the magnetic force when the armature 40 is close to the pole piece 26, but strengthens the magnetic force at longer strokes. This has the effect of linearizing and reducing the magnetic gain of the valve 10 for the usable distance of the armature stroke. This reduced magnetic gain allows the use of a much lower rate spring 52. The use of pin bearings in combination with the flux shunt portion 62 further linearizes and reduces the magnetic gain. The lower force gains result in even less pressure sensitivity to calibration, and therefore even more accurate calibrations. By threadably adjusting the pole piece 26 relative to the solenoid case 16, the magnetic attraction between the pole piece 26, the flux shunt portion 62 and the armature 40 can be adjusted for calibration in different systems.

The valve body 20 defines an internal bore 70 extending through the hydraulic portion 14. A spool valve 72 is positioned within the bore 70 and is axially movable therein. The spool valve 72 defines an axial spool valve chamber 74 extending the length of the spool valve 72. An upper end of the chamber 74 is in fluid communication with the chamber 70, and an upper end of the chamber 70 is sealed by the check ball 45 of the armature 40. The check ball 45 is seated against an annular seat portion 76 of the valve body 20. When the coil 30 is energized and the armature 40 moves upward towards the pole piece 26, the check ball 45 moves away from the seat portion 76 so that the chamber 70 is in fluid communication with an exhaust cavity 78. The exhaust cavity 78 is in communication with an annular exhaust port 80 through the valve body 20. A diaphragm 84 is positioned at an upper location in the exhaust cavity 78 and is connected to the valve body 20 and the pin element 44. The diaphragm 84 prevents hydraulic fluid from entering the magnetic portion 12, and is made of a suitable flexible material, such as silicon, that stands up to the rigors of the hydraulic environment, and does not deteriorate from hydraulic fluid.

A mounting bracket (not shown) is used to mount the valve 10 to a main module casting (not shown) to secure the solenoid valve 10 within the transmission. The lower end of the hydraulic portion 14 is inserted into the main module casting. A pair of O-rings 86 seal the valve 10 within the casting. In other embodiments, however, O-rings 86 are not required. In one embodiment, the main module casting includes other solenoid valves, stepper motors, hydraulic components, etc. used in the control of an automatic vehicle transmission, as would be well understood to those skilled in the art.

The valve body 20 further includes a supply port 92, a control port 94 and an exhaust port 96, all in fluid communication with the chamber 70. A filter 88, held in position by a cover 90, filters hydraulic fluid entering the supply port 92 and the control port 94. The spool-valve 72 includes an upper land 98, a lower land 100, and a narrow body portion 102 positioned between and connecting the upper land 98 and the lower land 100. The body portion 102 and the lands 98 and 100 define a control chamber 104 within the valve chamber 70, that is in fluid communication with the control port 94. In the position as shown, the upper land 98 covers the exhaust port 96 and the lower land 100 covers the supply port 92. A small feed orifice 106 is in fluid communication with the supply port 92 and the spool valve chamber 74. The valve body 20 includes a lower end cap 110. A lower chamber 112 of the valve body chamber 70 is defined between the spool valve 72 and the end cap 110. A spool valve spring 114 is positioned within the lower chamber 112 so that it contacts a lower end of the spool valve 72 and the end cap 110, and applies an upward bias on the spool valve 72 towards the magnetic portion 12. A feedback orifice 116 is in fluid communication with the control chamber 104 and the lower chamber 112.

When the control valve 10 is in a rest condition where no pressure is applied at any of the ports 92, 94 and 96 and the coil 30 is not energized, the valve spring 114 forces the spool valve 72 up until it contacts a bottom surface of the seat portion 76, and the armature spring 52 forces the armature 40 downwards so that the check ball 45 contacts a top surface of the seat portion 76. For this position of the spool valve 72, the exhaust port 96 is in fluid communication with the control chamber 104 and the control port 94. In operation, hydraulic fluid at a supply pressure $P_S$ for example 120 psi, is applied to the supply port 92. The hydraulic fluid at the supply pressure $P_S$ flows into the chamber 74 through the feed orifice 106. As the pressure in the chamber 74 increases, the spool valve 72 moves downward against the bias of the spring 114, closing off the exhaust port 96 from the control port 94 by the upper land 98. As the spool valve 72 continues to move down against the bias of the spring 114, the pressure in the lower chamber 112 increases. This causes the pressure in the control chamber 104 to increase through the feedback orifice 116, thus increasing the pressure at the control port 94.

When the pressure in the chamber 74 reaches a predetermined value as set by the armature spring 58, the pressure in the chamber 74 causes the armature 40 to move upwards to allow fluid within the chamber 74 to leak out through the exhaust port 80. By leaking pressure into the exhaust cavity 78, the spool valve 72 will be maintained at an equilibrium position within the chamber 70, and thus the control port pressure $P_C$ will be maintained at a constant value. In this equilibrium state, the valve 10 is relatively insensitive to fluctuations from vibrations and variations in line pressure, for example. By energizing the coil 30, the armature 40 is moved upward against the bias of the spring 52, and the pressure in the chamber 74 is reduced from an increased flow of fluid through the exhaust port 80. As the pressure in the chamber 74 decreases, the spool valve 72 will begin to rise with the bias of the spring 114 until the land 98 opens the exhaust port 96, and the pressure at the control port 94 is reduced to the exhaust port pressure. Because the feed orifice 106 is so small, the pressure in the chamber 74 cannot be increased fast enough from loss of fluid through the exhaust port 80 to effect the control pressure.

Figure 2:
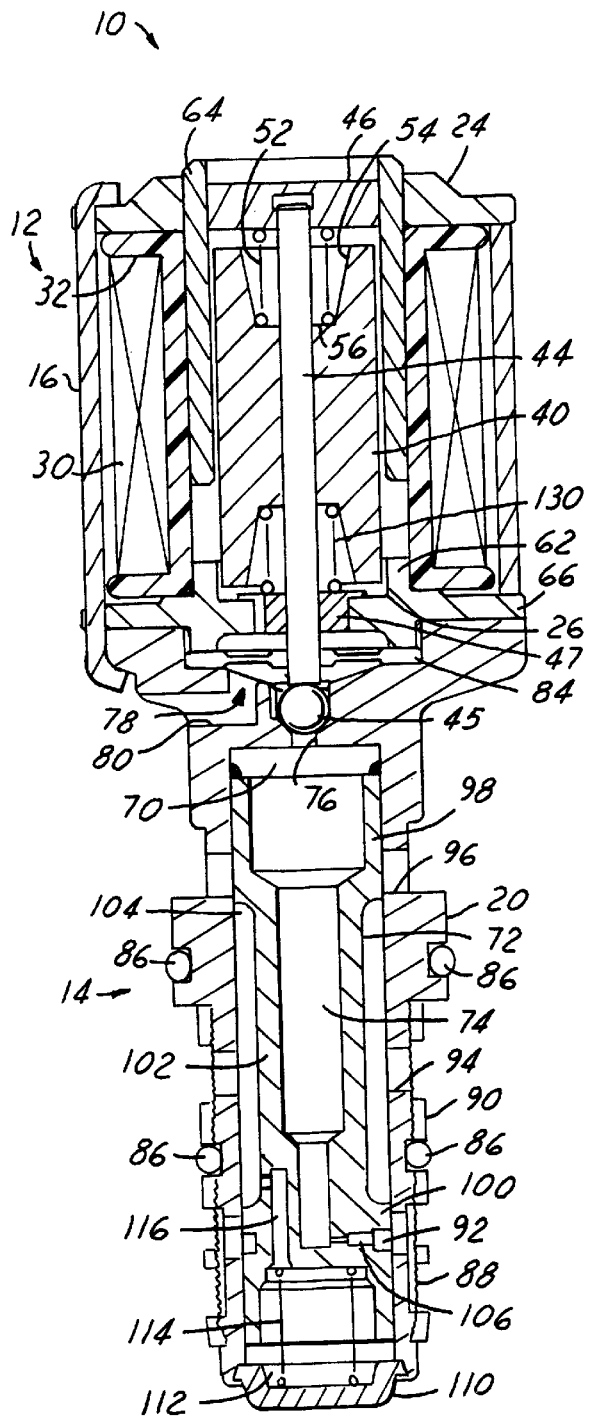
FIG. 2 is a cross-sectional view of an alternate embodiment of a variable force solenoid control valve in accordance with the present invention.

Although the configuration of the solenoid control valve 10 as described is best suited applications with normally high pressure, it can be used in a variety of environments and under a variety of pressures. An alternate embodiment is additionally capable of use in a variety of environments and pressures, however, it is best suited for environments that experience normally low pressure. Referring now to FIG. 2 which is a cross-section of the solenoid control valve 10 in this alternate embodiment. The solenoid control valve 10 includes all of the advantages previously described, including the advantages provided by the combination of the pin element 44, the upper pin bearing 46, the lower pin bearing 47, and the flux shunt portion 62, which act in concert to linearize and reduce the magnetic gain of the valve 10 and allow a reduction in the size and cost of the valve 10. The solenoid control valve 10, in this embodiment, places the pole piece 26 at the bottom of the magnetic section 12 and the flux tube 64 at the top. The flux tube 64 can be threadably engaged to the flux washer 25 to be adjustably positioned within the solenoid case 16. In a similar fashion, the angular flange 66 is attached to the pole piece 26 at the bottom of the magnetic section 12 rather than to the flux tube 64 in the prior embodiment. This embodiment can additionally include a secondary spring 130 positioned between the armature 40 and the lower pin bearing 47. The use of the secondary spring 130 facilitates the solenoid control valve 10 in accommodating pressure settings around 0 psi. Although a secondary spring 130 has been described, the present embodiment is contemplated for use without it as well.

While particular embodiments of the invention have been shown and described, numerous variations and alternate embodiments will occur to those skilled in the art. Accordingly, it is intended that the invention be limited only in terms of the appended claims.

What is claimed is:

1. A solenoid control valve comprising:

a housing defining an internal chamber therein;

an electromagnetic coil wound on a bobbin and coaxially mounted within the housing relative to the internal chamber;

a movable armature positioned within the bobbin in the internal chamber and having a first end and a second end, said movable armature including a pin element and a check ball;

an upper pin bearing;

a lower pin bearing, said lower pin bearing and said upper pin bearing minimizing non-coaxial movement of the movable armature;

an armature spring in contact with the first end of the armature, said armature spring biasing the armature to a first position within the internal chamber and said armature being movable from the first position to a second position against the bias of the spring upon energizing of the electromagnetic coil;

a pole piece mounted to the housing and positioned adjacent to the first end of the armature and defining an air gap therebetween, said pole piece including a flux shunt piece being an annular flange extending towards the armature, said flux shunt piece causing electromagnetic field lines from the coil to extend radially from the armature when the electromagnetic coil is energized so as to weaken the magnetic force on the armature when the armature moves toward the pole piece to the second position;

a flux tube secured to the bobbin and the housing and acting to define the electromagnetic field lines from the electrical magnetic coil, said flux tube including an annular flange extending around a bottom portion of the tube; and a valve body assembly including a supply port, an exhaust port and a control port, said valve body assembly including a central bore axially aligned with the armature and in fluid communication with the supply port, exhaust port, and the control port, said valve body assembly including a spool valve disposed within the central bore, said valve body assembly further including a spool valve spring that biases the spool valve towards the armature.

2. A solenoid control valve as described in claim 1 wherein said first end of the armature is positioned within an opening defined by said flux shunt piece when said armature is in said second position.

3. A solenoid control valve as described in claim 1 wherein said pole piece is threadably connected to said housing so as to control the distance of the air gap between said pole piece and said armature.

4. A solenoid control valve as described in claim 1 wherein said pole piece and said flux shunt piece are a single member fabricated from a piece of metal.

5. A solenoid control valve as described in claim 1 wherein said valve body assembly is mounted directly to said housing.

6. A solenoid control valve as described in claim 1 wherein said valve body assembly is remotely situated from said housing.

7. A solenoid control valve as described in claim 1 wherein said valve body assembly includes an opening in fluid communication with said central bore and said spool valve includes a central chamber in fluid communication with said central bore of said valve body assembly, said check ball of the armature seated against said valve body assembly when said armature is in said first position to seal said central bore.

8. A solenoid control valve as described in claim 7 wherein said supply port is in fluid communication with said central bore of said spool valve so that said spool valve moves away from said electromagnetic coil against the bias of said valve spring when a source pressure is applied to said supply port.

9. A solenoid control valve as described in claim 1 for use in the transmission of a vehicle.

10. A solenoid control valve comprising:

a housing defining an internal chamber therein;

an electromagnetic coil wound on a bobbin and coaxially mounted within the housing relative to the internal chamber;

a movable armature positioned within the bobbin in the internal chamber and having a first end and a second end, said movable armature including a pin element and a check ball;

an upper pin bearing;

a lower pin bearing, said lower pin bearing and said upper pin bearing minimizing non-coaxial movement of the movable armature;

an armature spring in contact with the first end of the armature, said armature spring biasing the armature to a first position within the internal chamber and said armature being movable from the first position to a second position against the bias of the spring upon energizing of the electromagnetic coil;

a pole piece mounted to the housing and positioned adjacent to the second end of the armature and defining an air gap therebetween, said pole piece including a flux shunt piece being an annular flange extending towards the armature, said flux shunt piece causing electromagnetic field lines from the coil to extend radially from the armature when the electromagnetic coil is energized so as to weaken the magnetic force on the armature when the armature moves away from the pole piece to the second position, said pole piece including an annular flange;

a flux tube secured to the bobbin and the housing and acting to define the electromagnetic field lines from the electrical magnetic coil; and a valve body assembly including a supply port, an exhaust port and a control port, said valve body assembly including a central bore axially aligned with the armature and in fluid communication with the supply port, exhaust port, and the control port, said valve body assembly including a spool valve disposed within the central bore, said valve body assembly further including a spool valve spring that biases the spool valve towards the armature.

11. A solenoid control valve as described in claim 10 wherein said first end of the armature is positioned within an opening defined by said flux shunt piece when said armature is in said first position.

12. A solenoid control valve as described in claim 10 wherein said flux tube is threadably connected to said housing so as to control the strength of the magnetic field created by said flux tube.

13. A solenoid control valve as described in claim 10 wherein said pole piece and said flux shunt piece are a single member fabricated from a piece of metal.

14. A solenoid control valve as described in claim 10 further comprising:

a secondary spring, in contact with the second end of the armature, said armature spring applying a force against said armature in a direction opposite the force applied by said armature spring, said secondary spring facilitating the solenoid control valve to be operational at low pressure values.

15. A solenoid control valve as described in claim 10 wherein said valve body assembly is mounted directly to said housing.

16. A solenoid control valve as described in claim 10 wherein said valve body assembly is remotely situated from said housing.

17. A solenoid control valve as described in claim 10 wherein said valve body assembly includes an opening in fluid communication with said central bore and said spool valve includes a central chamber in fluid communication with said central bore of said valve body assembly, said check ball of the armature seating against said valve body assembly when said armature is in said first position to seal said central bore.

18. A solenoid control valve as described in claim 17 wherein said supply port is in fluid communication with said central bore of said spool valve so that said spool valve moves away from said electromagnetic coil against the bias of said valve spring when a source pressure is applied to said supply port.

19. A solenoid control valve as described in claim 10 for use in the transmission of a vehicle.

* * * * *